No. 879,585. PATENTED FEB. 18, 1908.
H. C. REMMERS.
CONFECTIONERY COATING MACHINE.
APPLICATION FILED JULY 25, 1907.
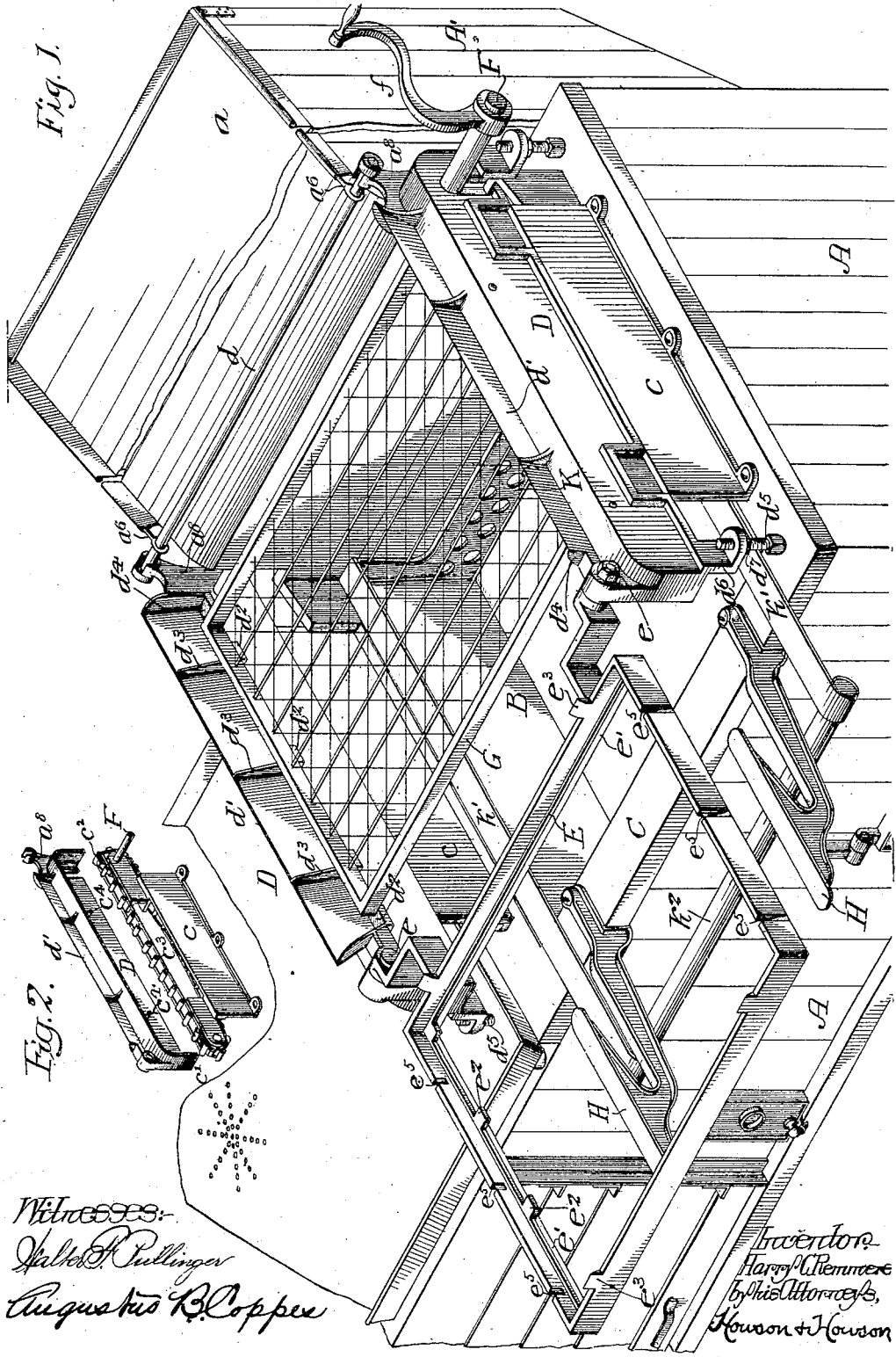

UNITED STATES PATENT OFFICE.

HARRY C. REMMERS, OF PHILADELPHIA, PENNSYLVANIA.

CONFECTIONERY-COATING MACHINE.

No. 879,585.  Specification of Letters Patent.  Patented Feb. 18, 1908.

Application filed July 25, 1907. Serial No. 385,452.

*To all whom it may concern:*

Be it known that I, HARRY C. REMMERS, a citizen of the United States, residing in Philadelphia, Pennsylvania, have invented certain Improvements in Confectionery-Coating Machines, of which the following is a specification.

My invention relates to apparatus particularly designed for coating candies of various kinds with chocolate or other material, one object being to provide an improved form of receiving or retaining structure for the candy holding basket after this has been dipped in the melted chocolate and while the surplus chocolate is being knocked off, which shall be easily kept clean and at the same time tend to prevent objectionable spreading of the chocolate.

I further desire to provide a machine of the general type shown in my Patent No. 843,300, dated February 5, 1907, with a form of basket receiving device which shall be so constructed as to permit of a more rapid and efficient operation of the machine than has hitherto been possible.

These objects and other advantageous ends I attain as hereinafter set forth, reference being had to the accompanying drawings, in which, Figure 1, is a perspective view of the main portion of a coating machine constructed according to my invention, and Fig. 2, is a perspective view illustrating certain details.

In the above drawings, A represents the body of the machine which has a kettle B for the reception of the chocolate or other material to be applied to candy, etc., and as will be understood by those skilled in the art, this body is provided with any desired form of means (not shown) for heating the kettle, such for example, as is shown and described in my patent aforesaid.

The heated products of combustion from the heating means within the body A escape through a flue like extension A' and serve to heat an inclined pan $a$ which leads into the kettle B. This pan, while having flanges or sides along three of its edges, is open at its lowermost edge and has projecting at its lower opposite corners, two extensions $a^6$. These normally engage a cross bar $d$ removably held in suitably slotted brackets $a^8$, forming part of or attached to two structures D hereafter referred to.

In the present instance, I provide the upper portion of the body A with a frame or top portion C and on this mount the basket receiving structures as well as the knocking off mechanism. With this idea in view, I fix to opposite sides of the frame C upwardly extending plate like structures $c$ and provide each of these with bearings for the reception of a shaft F. Each of said structures also has a bearing in which is carried a spindle having a sprocket wheel $c'$, there being also two sprocket wheels $c^2$ on the shaft F respectively in line with the wheels $c'$. An elongated casing D which is open at the bottom, incloses each pair of sprocket wheels $c'$ and $c^2$ and also contains within it a sprocket chain $c^3$ connecting said wheels. One or more projections $c^4$ is provided within each casing D so as to be engaged by the links of the chain $c^3$ and cause vibration of the said casings and their associated parts when the shaft F is turned. These two casings D are connected at one end by the bar $d$ and at the opposite end by a frame E, which latter is held in place by pivot bolts $e$ so placed as to permit said frame to turn on them through an arc of 180°. The shaft F extends through one end of each of the casings D and is provided with a crank shaft $f$ whereby it may be turned.

For the purpose of supporting a candy-holding basket G over the kettle and at the same time preventing the escape of liquid chocolate over the edges of the machine, I provide each of the casings D with upwardly and outwardly extending flanges $d'$, each of which has lugs $d^2$ projecting inwardly from its lower edge, for supporting the basket over the kettle. In order to keep the basket at a sufficient distance from the flanges $d'$, so as to permit the sides of the frame E to fit around it, I provide said flange with a number of vertically extending ribs $d^3$, and also turn in its end portions $d^4$, so that the resulting structure, which is preferably integral with the main portion of the casing D in each case, not only effectually prevents any escape of the liquid chocolate, but directs it into the kettle. When it is desired to vary the violence or intensity of the jar or vibration given to a tray or basket carried by the casings D, this may be done by proper manipulation of screws $d^5$ resting upon the frame C and passing through lugs $d^6$ forming part of the said structures D. Jam nuts $d^7$ may be provided to maintain these screws in any adjusted positions.

Fixed to the frame C in any desired manner are a pair of brackets H projecting toward the front thereof, while immediately above these is the frame E, which as before noted is pivoted by the bolts $e$ to the two structures D. This frame is preferably open and rectangular in shape and is provided with an inwardly projecting flange $e'$, as well as with lugs $e^2$ which project inwardly beyond said flange. In addition, on the front and back of this frame are upwardly extending lugs $e^3$ tapered or wedge shaped from their upper edges downwardly. The opposite side members of the frame E are slotted as shown at $e^5$, so that said members are not interfered with by the ribs $d^3$ when the frame is turned over a basket.

Under operating conditions, the kettle B is filled with chocolate or other material which is kept melted and the candies to be coated are placed upon or in the basket G. By means of a suitable set of tongs or carriers this basket is then lowered into the kettle, its dimensions being such that it must be inclined to the horizontal in order to be moved downwardly past the inwardly extending lugs $d^2$. After immersion in the melted chocolate, the basket is raised and allowed to rest upon the lugs $d^2$, and while so doing, is subjected to a violent agitation caused by turning the handle $f$. After the surplus chocolate has been knocked off by this vibration, the frame E is turned through 180° so as to bring it over the candy basket G, and in so doing the beveled lugs $e^3$ insure that the basket shall be properly engaged inasmuch as they tend to slide it upon the lugs $d^2$ should it be displaced. After the frame E has thus been fitted around the basket, a board or other device upon which it is desired to place the candies is put over said frame, though it is kept from actually touching the candy basket by means of the flange $e'$. The candy basket and the edges of the frame E are then grasped by the operator and the two structures with the board are turned back to the original position shown in the drawings so that the candies are deposited upon the board, which may be allowed to rest on the brackets H, after which the candy basket may be removed. The removal of the candies from the basket may, if desired, be facilitated by a slight vibration of the frame E given it by turning the handle $f$. It will be noted that the outwardly inclined flanges $d'$ tend to guide the candy basket into the proper position over the kettle B and when said basket is being placed upon the supporting lugs $d^2$ such parts also serve to prevent an objectionable flow of melted chocolate from the side portions of the machine.

For the purpose of agitating the chocolate in the kettle, I provide a perforated vertically placed plate K within said kettle and connect horizontal bars $k'$ to upwardly extending portions $k$ which are placed at the ends of the plate so as to bring the bars $k'$ at the extreme sides of the kettle. Said bars are joined at their ends by a cross piece $k^2$ and rest upon the upper surface of the frame C.

The pan $a$ is commonly used for the reception of the tongs, etc., by which the candy baskets are manipulated and the movement of chocolate from this pan into the kettle is accelerated by the jarring or vibration imparted to it from the casings D through the rod $d$ and the extensions $a^6$.

I claim:—

1. The combination in a coating machine, of a kettle, a basket supporting structure over said kettle, a pivotally mounted frame placed adjacent to said basket supporting structure so as to be capable of co-acting therewith to receive a basket, said frame being of an open construction to permit of the discharge of candies from the basket after it has been turned on its pivots, substantially as described.

2. The combination of a kettle, with a basket supporting structure mounted above the same, and having two side members, with a supplementary frame pivoted to said side members, so as to be capable of receiving a basket therefrom, said frame being of an open construction to permit of the discharge of candies from the basket after it has been turned on its pivots, substantially as described.

3. The combination of a kettle, a basket structure mounted above the same, with means for vibrating said structure, a supplementary structure arranged to be movable into a position to receive a basket from said first structure, said supplementary structure being of an open construction so as to permit of the discharge of candies through it.

4. The combination of a kettle, independent structures mounted on opposite sides thereof, each having means whereby it may be vibrated and being formed so as to be capable of together supporting a candy basket, with a supplementary frame having a pivotal connection with each of said structures, substantially as described.

5. The combination with a kettle of structures mounted above and on opposite sides of said kettle, said structures each having an outwardly extending flange for guiding and maintaining a basket in position over the kettle, and being provided with knocking off devices, substantially as described.

6. The combination with a kettle of structures mounted above and on opposite sides of said kettle, said structures having an outwardly extending flange, and being provided with knocking off devices, with a supplementary frame pivoted to said structures and capable of receiving a candy basket therefrom, substantially as described.

7. The combination with a kettle, bearings mounted above the same, with a shaft in said bearings, inclosed structures mounted on opposite sides of the machine above the kettle, mechanism in said structures operated by said shaft for agitating a candy basket carried on said structures, with means for adjusting the position of said structures to vary the vibration given them, substantially as described.

8. The combination of a kettle having a supporting structure, inclosed casings having each an upwardly extending flange, forming a structure for the reception of a candy basket, means within said inclosed structures for vibrating the same, with adjusting screws extending between the kettle supporting structure and the said basket supporting structures for varying the operation of the agitating means, substantially as described.

9. The combination of a kettle having a supporting structure, inclosed casings having each an upwardly extending flange forming a structure for the reception of a candy basket, means within said inclosed structures for vibrating the same, with adjusting screws extending between the kettle supporting structure and the said basket supporting structures for varying the operation of the agitating means, and a supplementary frame provided with means whereby it is connected to both of the said basket supporting structures so as to be capable of receiving a basket therefrom, substantially as described.

10. The combination with a kettle of a structure for supporting a candy basket over the same, a supplementary frame pivotally connected to said structure so as to be capable of co-acting therewith, tray supporting brackets mounted to one side of the kettle and placed to be directly under said supplementary frame when this has been turned on its pivots.

11. The combination of a kettle, structures mounted above said kettle on opposite sides of the same, means for vibrating said structures, outwardly flared flanges and inwardly projecting lugs attached to said structures for the reception of a candy basket, a rectangular frame having pivotal connections with each of said structures, inwardly projecting lugs upon the frame and upwardly projecting beveled lugs also on the frame placed to co-act with the side members of a candy basket supported over the kettle, substantially as described.

12. The combination of a kettle, a structure over the same, provided with vertically ribbed flanges for the reception of a candy basket, and a frame capable of fitting within said flanges and around a candy basket thereon, said frame having slotted side members to accommodate the ribs of the flanges, substantially as described.

13. The combination of a kettle, a structure over the same, provided with vertically ribbed flanges for the reception of a candy basket, and a frame capable of fitting within said flanges and around a candy basket thereon, said frame having slotted side members to accommodate the ribs of the flanges and being provided with lugs for sliding a basket into position to be properly engaged when the frame is turned over it, substantially as described.

14. The combination of a kettle, structures for supporting a candy basket over the same, a pan emptying into the kettle, with means for jarring the basket supporting structures and said pan, substantially as described.

15. The combination of a kettle, an inclined pan emptying into said kettle, a basket supporting structure above the kettle, means for mechanically connecting the basket supporting structure with the pan, and means for jarring the said structure, substantially as described.

In witness whereof I have signed my name to this specification, in the presence of two subscribing witnesses.

HARRY C. REMMERS.

Witnesses:
Wm. A. Barr,
William E. Bradley.